United States Patent [19]
Labbe et al.

[11] 4,345,438
[45] Aug. 24, 1982

[54] DEAERATOR LEVEL CONTROL

[75] Inventors: Donald E. Labbe, Woburn; Joseph E. Dutremble, Ipswich, both of Mass.

[73] Assignee: General Electric Company, Lynn, Mass.

[21] Appl. No.: 182,957

[22] Filed: Sep. 2, 1980

[51] Int. Cl.³ .............................................. F01K 19/00
[52] U.S. Cl. ......................................... 60/657; 60/660
[58] Field of Search ................. 60/646, 657, 660, 667, 60/686

[56] References Cited

U.S. PATENT DOCUMENTS

| | | | |
|---|---|---|---|
| 3,172,462 | 3/1965 | Brunner | 165/1 |
| 3,250,259 | 5/1966 | Profos | 122/406 |
| 3,417,737 | 12/1968 | Shinskey et al. | 122/448 |
| 3,780,705 | 12/1973 | Le Febve de Vivy | 122/451 |
| 3,803,846 | 4/1974 | Letvin | 60/646 X |
| 4,311,013 | 1/1982 | Kuribayashi et al. | 60/646 |

FOREIGN PATENT DOCUMENTS 54-158554 12/1979 Japan ..................................... 60/657

Primary Examiner—Allen M. Ostrager
Assistant Examiner—Stephen F. Husar
Attorney, Agent, or Firm—James W. Mitchell

[57] ABSTRACT

In a power plant, a deaerator is a feedwater conditioning device which provides direct contact feedwater heating as well as providing for oxygen removal to inhibit corrosion. Under some conditions, called transients, rapid depressurization could occur in the deaerator which might result in damage to internal deaerator parts. By limiting the condensate flow into the deaerator, the rate of depressurization can be reduced. A control system is described which will react to a reduction in turbine load by reducing the flow of condensate to the deaerator.

5 Claims, 3 Drawing Figures

DEAERATOR LEVEL CONTROL

BACKGROUND OF THE INVENTION

This invention relates, in general, to power plants which use a deaerator for heating power plant feedwater and for removing oxygen from the feedwater and, in particular, to a control for reducing condensate flow to the deaerator during transient conditions such as reductions in load.

In a power plant, the deaerator is a feedwater conditioning device which causes the removal of oxygen from turbine condensate and provides direct contact feedwater heating. The deaerator is in place between the turbine condenser and the power plant boiler and, hence, receives condensate and outputs feedwater. The deaerator may be a two chamber pressure vessel comprising a deaerating section and a storage tank. The deaerating section and storage tank are interconnected by pressure equalizers and a drain. Normally, the deaerating section is supplied with steam taken from a flash tank or a turbine extraction port.

If there is a reduction in turbine load, there will also be a reduction in available supply steam to the deaerator. This condition in steam pressure is immediately transmitted through the equilizers to the storage tank which is in a saturated condition. The liquid in the storage tank begins flashing steam which then rises into the equalizers. If the pressure drop across the equalizers exceeds the static head in the deaerating section, the incoming condensate will be "backed up" and cause flooding in the deaerating "spray tray" section. This condition has resulted in the dislodging of spray trays.

With a loss of load on the turbine, any feedwater heaters upstream from the deaerator will also lose their source of heat from the turbine; i.e., extraction steam. This will then result in a condensate temperature decrease which will further aggravate the pressure decay-flashing syndrome. The temperature deficiency in the incoming feedwater may be three times the normal design temperature difference. This means that roughly three times the steam flow is needed to compensate for the loss of feedwater heating. Pressure drop across the trays is proportional to the square of the flow which then means that the increase in pressure drop across the trays is approximatey nine times the normal amount.

The foregoing problems are further aggravated as the storage tank water level falls due to the inhibited drain of condensate into the storage tank while the boiler feedpump demands remain the same. The water level controller will see this falling water level and try to correct the situation by increasing condensate in-flow, thereby putting further energy demands on the system. From the foregoing, it can be seen that single-element control; i.e., level control, is inadequate except for steady state conditions. Conventional three-element controls which measure in-flow, out-flow and level are also inadequate under the described circumstances.

BRIEF DESCRIPTION OF THE INVENTION

The invention is a condensate flow controller which senses water level, condensate flow and turbine load. A water level error signal is combined with a signal representative of turbine load to create a condensate flow demand signal. The condensate flow signal is compared with the demand signal to produce a condensate flow error signal which is translated into a new valve position demand signal. A preferred signal indicative of turbine load is the first stage shell pressure.

OBJECTS OF THE INVENTION

It is an object of the invention to provide a level controller for a deaerator which will quickly respond to load transients in the power plant.

It is another object of the invention to minimize depressurization of the deaerator during loss of load transients.

It is another object of the invention to decrease the in-flow of condensate into the deaerator during turbine load reduction.

The novel features believed characteristic of the present invention are set forth in the appended claims. The invention itself, however, together with further objects and advantages thereof, may best be understood with reference to the following description taken in connection with the drawings.

DETAILED DESCRIPTION OF THE INVENTION

Figure 1:
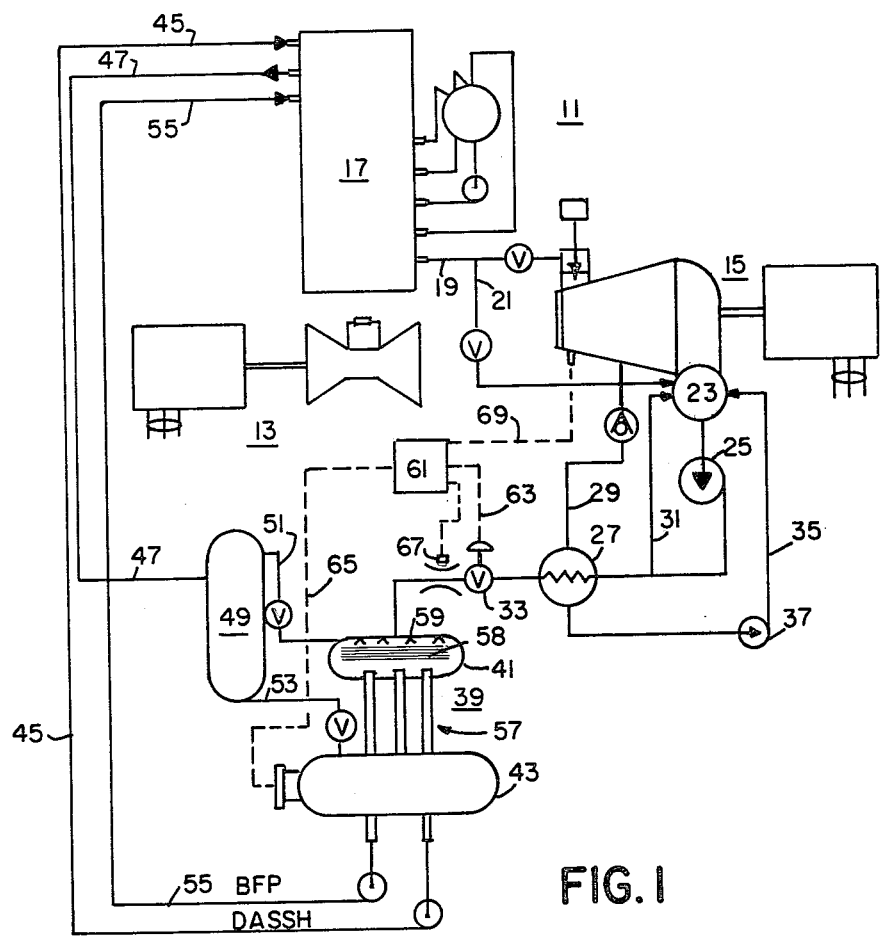
FIG. 1 is an outline schematic drawing of a power plant showing the present invention and its incorporation into the power plant.

FIG. 1 shows a combined cycle power plant 11 which includes at least one gas turbine-generator power plant 13 and at least one stream turbine-generator power plant 15. Hot exhaust gas from the gas turbine power plant is input into a waste heat boiler or heat recovery steam generator (HRSG) 17 in order to produce steam for the steam turbine. The combined cycle power plant 11 is highly efficient as otherwise wasted hot exhaust gases from the gas turbine power plant are channeled through the heat recovery steam generator to produce a steam output into main steam header 19. Bypass steam header 21 is used during start-up and when it is desirable to divert steam directly into the turbine condenser 23. A condensate pump 25 pumps condensate through a feedwater heater 27 which receives its heat input from extraction line 29. A first recirculation loop 31 diverts condensate to the condenser in accordance with the position of condensate flow control valve 33. A second recirculation loop 35 and pump 37 directs extraction line condensate to the steam turbine condenser.

The preheated output of feedwater heater 27 is input into a deaerator 39. The deaerator is a two chamber pressure vessel which includes a deaerating section 41 and a storage tank 43. The deaerator forms part of a Deaerating Steam Supply Heater (DASSH) loop which provides treated feedwater in line 45 to the HRSG where it is further heated in a low pressure economizer (not shown). The output of the low pressure economizer is carried in pipe 47 to a flash tank 49. Flash tank 49 supplies steam to the deaerating section 41 through steam supply line 51. Line 53 is also included for adjusting the water level of the flash tank as required.

A second output from the deaerator storage tank is the boiler feedpump withdrawal on line 55. The liquid is delivered to the HRSG where it is heated into steam in the conventional manner.

The deaerator 39 further includes pressure equalizers 57 which under conditions of equilibrium cause the storage tank liquid to be at saturation condition. The pressure equilizers also provide a support connection between the two deaerator parts as well as a drain connection. Under conditions of rapid depressurization in the deaerating section 41, steam will rise through the equalizers into the deaerating section to heat incoming condensate. The deaerating section further includes so-called spray trays 58 which enhance the deaerating process as well as spray nozzles 59 which are connected to the condensate line. The flow of condensate into the deaerator is controlled by the condensate flow control valve 33 which is directed by a control circuit represented by box 61. The valve position signal is output on line 63 whereas inputs to the control circuit include a deaerator water level signal 65, a condensate flow signal 67 and a first stage steam pressure signal 69.

Figure 2:
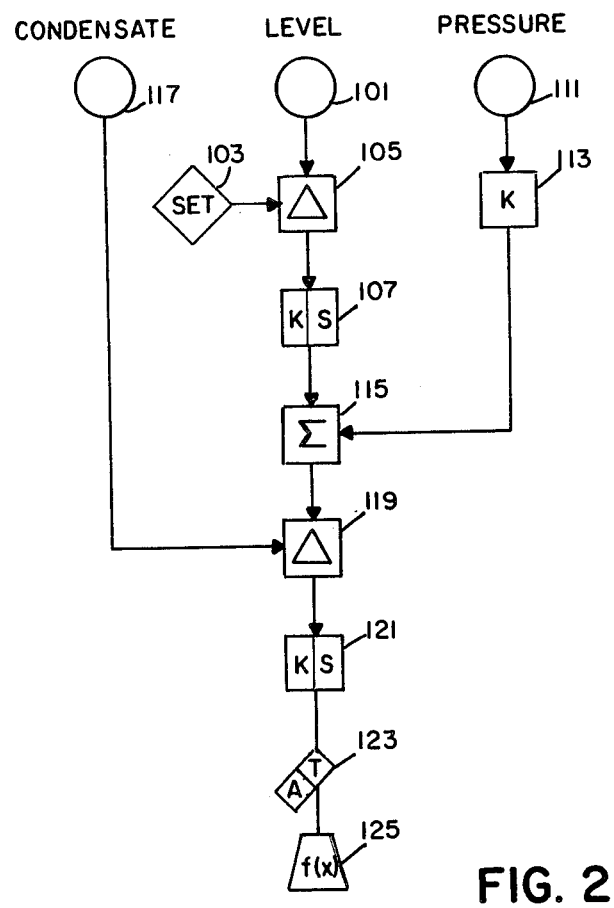
FIG. 2 is a logic diagram of a three-element level control circuit according to the present invention.

FIG. 2 is a logic diagram of a level controller according to the present invention. The deaerator storage tank water level 101 corresponding to line 65, FIG. 1, is compared with a water level setpoint in a comparator device 105. The output of the difference comparator represents the difference between actual water level and level setpoint which is then input into proportional plus integrator device 107 to provide an output error signal proportional to the difference in water level.

Pressure signal 111 corresponding to line 69, FIG. 1, is derived as first stage shell pressure from the steam turbine. Alternatively, inlet steam flow could be used as a substitute parameter, megawatt output of the generator or any other indication of turbine load. This signal is multiplied by a K factor 113 so that it is compatible with the condensate flow signal. In one example, condensate flow has been found to be less than, but directly proportional to, steam flow or pressure because of the several extraction lines which may follow first stage pressure readings. Hence, the K factor is a signal bias according to the physical construction of the turbine plant. The level error signal and the pressure signal are input into a summing device 115 so that the output becomes a flow demand signal for condensate coming into the deaerator.

Condensate signal 117 corresponds to condensate flow signal 67 in FIG. 1. As is the case with pressure and level measurements, any suitable transducer may be used to provide a signal proportional to flow. The flow demand signal output from summing junction 15 is, in essence, a setpoint signal which the condensate flow signal should match and, hence, the condensate flow signal is a feedback signal from the system. The two signals are input into difference comparator 119 so that the output of the comparator represents a deviation from setpoint; i.e., the flow demand signal. The comparator 119 output signal is then input into a proportional plus integral function 121 so that it becomes a valve control signal through manual/automatic transfer function 123 into valve operator 125. Referring to FIG. 1, the output of the valve operator 125 would be the signal appearing on line 63 to control the valve 33. The valve 33, upstream from the deaerator 39, controls the condensate water flow into the deaerator.

Figure 3:
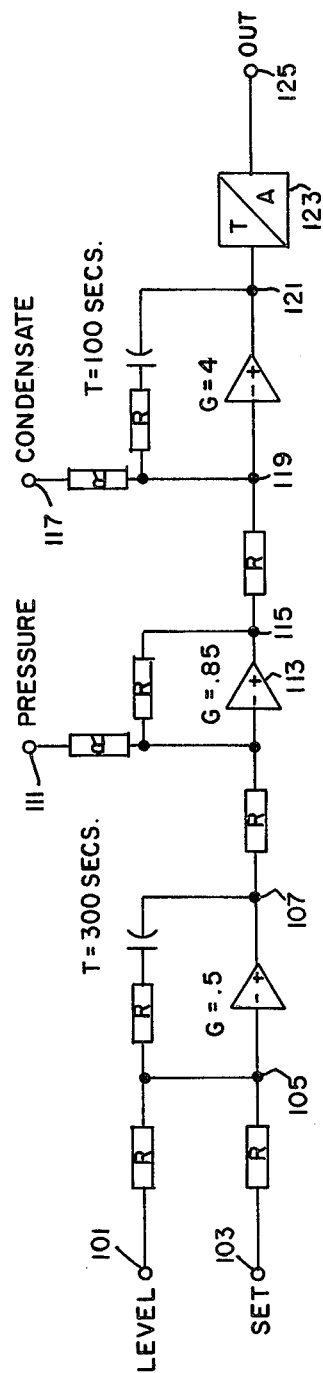
FIG. 3 is a line diagram of an electrical circuit which may be used in carrying out the present invention.

FIG. 3 is a schematic of a typical electrical circuit by which the present invention may be implemented. Numbers have been taken from FIG. 2 and inserted into FIG. 3 where appropriate. The circuitry for producing a level error signal, numbers 101 through 107, is given a relatively large time constant; i.e., 300 sec. and small gain. This is to temper signal output due to rapid fluctuations in water level and further to minimize temporary excursions in the wrong direction. For example, in the situation where steam flashing occurs in the storage tank and drainage of condensate to the storage tank is impeded, there may be a temporary decrease in water level. However, under this condition, it is desirable to limit condensate flow so as not to increase flashing. Therefore the level signal is given little weight over the short period in order to enable the system to absorb some transient conditions.

In the circuit for introducing the steam pressure signal, numbers 111 through 115, the gain factor, $G=0.85$, takes into account steam losses through the turbine due to steam extraction ports. Finally, in the circuit portion for introducing the condensate flow signal and processing the signal to OUT, numbers 117 through 125, a large gain factor is applied so that changes in steam pressure and condensate flow may be quickly accommodated by the flow control valve. In other words, the circuitry deals slowly with the effect; i.e., level condition and more swiftly with the causes; i.e., condensate flow or turbine steam pressure.

In operation, the level controller senses condensate flow, water level and a signal indicative of turbine load and applies an output signal to a control valve in the condensate path upstream from the deaerator. A level error signal is determined by comparing actual storage tank level to a level setpoint. This error signal is integrated and then compared with a turbine pressure signal to derive a condensate flow demand signal. The condensate flow demand signal is compared with a condensate flow signal to derive a valve position signal in accordance with the difference between the flow and demand signal and the valve is adjusted accordingly.

While there has been shown what is considered, at present, to be the preferred embodiment of the invention, it is, of course, understood that various modifications may be made therein with respect to the application and details of the invention. Such modifications may include using turbine inlet steam flow or electrical output as a load factor instead of first stage shell pressure. It is intended to cover all such modifications as fall within the true spirit and scope of the invention.

What is claimed is:

1. In a steam turbine power plant including a steam turbine and condenser providing condensate to a steam deaerator, the condensate flow being regulated by a flow control valve upstream from the deaerator, a deaerator water level control positioning the flow control valve comprising:
   means providing a water level error signal proportional to the difference between the actual deaerator water level and the water level setpoint;
   summing means providing a flow demand signal based upon the water level error signal and a turbine load signal; and,
   means providing a valve position signal based upon the difference between the flow demand signal and a condensate flow signal.

2. The deaerator water level control recited in claim 1 wherein the turbine load signal is first stage shell pressure.

3. The deaerator water level control recited in claim 1 wherein the turbine load signal is turbine inlet steam flow.

4. In a steam turbine power plant including a steam turbine and condenser providing condensate to a steam deaerator, said condensate flow being regulated by a flow control valve upstream from the deaerator, a control circuit for generating a valve control signal comprising:

- a first integrator circuit including a differential comparator for comparing deaerator water level with a water level setpoint and providing an output water level error signal;
- a summing circuit combining the water level error signal and a turbine stage pressure signal to provide an output flow demand signal; and,
- a second integrator circuit including a differential comparator for comparing a condensate flow signal with the flow demand signal and providing the condensate flow valve control signal.

5. A deaerator water level control circuit comprising:
- a first integrator circuit including a differential comparator for comparing deaerator water level with a water level setpoint and providing an output water level error signal;
- a summing circuit combining the water level error signal and a turbine stage pressure signal to provide an output flow demand signal; and,
- a second integrator circuit including a differential comparator for comparing a condensate flow signal with the flow demand signal and providing the condensate flow valve control signal.

* * * * *